United States Patent [19]

MacKay

[11] 4,052,566
[45] * Oct. 4, 1977

[54] MULTIPLEXER TRANSMITTER TERMINATOR

[75] Inventor: William Allan MacKay, Richmond Hill, Canada

[73] Assignee: D.D.I. Communications, Inc.

[*] Notice: The portion of the term of this patent subsequent to Oct. 4, 1994, has been disclaimed.

[21] Appl. No.: 644,101

[22] Filed: Dec. 24, 1975

[51] Int. Cl.$^2$ .............................................. H04J 3/04
[52] U.S. Cl. ............................. 179/15 A; 179/15 AL; 179/15 BS
[58] Field of Search .......... 179/15 AL, 15 BA, 15 A, 179/15 R, 18 FC, 15 BS; 307/234

[56] References Cited

U.S. PATENT DOCUMENTS

| | | | |
|---|---|---|---|
| 3,588,365 | 6/1971 | McNeilly | 179/15 AL |
| 3,723,658 | 3/1973 | Huebner | 179/15 R |
| 3,737,677 | 6/1973 | Huebner | 307/234 |
| 3,757,050 | 9/1973 | Mizote | 179/15 AL |
| 3,804,986 | 4/1974 | Wakamatsu | 179/15 AL |
| 3,814,861 | 6/1974 | Robbins | 179/15 A |
| 3,870,825 | 3/1975 | Roberts | 179/15 AL |

Primary Examiner—David L. Stewart
Attorney, Agent, or Firm—Woodling, Krost, Granger & Rust

[57] ABSTRACT

A multiplexer transmitter terminator is disclosed for connection to a multiplexer transmitter in a system having a plurality of multiplexer transmitters connected on a common communication line. Each of the multiplexer transmitters is assigned a time period for transmission relative to a multiplexer time clock. The improvement includes a counter circuit connected to the multiplexer time clock for providing a counter output upon counting a preselected number of clock pulses which output corresponds to the time period assigned for transmission of the multiplexer transmitter. A line receiver is connected to the communication line for providing an output upon detecting a predetermined period of signal absence on the communication line. The line receiver output is connected to the counter circuit to reset the counter after the predetermined period of signal absence. The counter circuit is connected to the multiplexer transmitter for enabling transmission through the communication line only at the time period assigned to the multiplexer transmitter. The foregoing abstract is merely a resume of one general application, is not a complete discussion of all principles of operation or applications, and is not to be construed as a limitation on the scope of the claimed subject matter.

17 Claims, 3 Drawing Figures

MULTIPLEXER TRANSMITTER TERMINATOR

BACKGROUND OF THE INVENTION

1. Field of the Invention

The invention relates to Telephony, Systems, multiplexed.

2. Description of the Prior Art

Various types of multiplexer systems have been known to the prior art for many years. In one type of multiplexer system, information on a plurality of terminals is serially transmitted relative to a multiplexer time clock through a communication line. The multiplexer transmitter and multiplexer receiver are each synchronized with the multiplexer time clock to enable the transmission of plural information on a single communication line over a given time period.

There have been many novel systems to extend the amount of information which could be handled by a single communication line. Of prime importance is to easily extend the number of information terminals of the transmitter and the receiver without rewiring the multiplexer system. For example, U.S. Pat. Nos. 3,691,304; 3,691,305; 3,723,658; and 3,737,677 disclose an extendable multiplexing system, wherein the number of multiplexer channels can be increased without rewiring the multiplexer system. However, the aforementioned improvements in the art restrict all of the transmitter or receiver units to be in a single location. Sometimes it is desirable to have several transmitters being remote from one another and connected through a communication line to several receivers which are remote from one another. The prior art has not provided a system which is readily adaptable to existing multiplexer systems to connect a plurality of transmitters, each of which may be remote from one another, to one end of a communication line for information transfer to a plurality of receivers on the other end of the communication line which receivers may be remote from one another. Such a system for expanding the number of transmitters and receivers on a communication line must be compatable with existing equipment in order to avoid reinstallation of the multiplexer system when addition units are desired.

Therefore an object of this invention is to provide a multiplexer transmitter terminator for connecting with a multiplexer transmitter on a communication line having a plurality of multiplexer transmitters which will connect and activate the multiplexer transmitter only at a specific time designated for operation of the multiplexer transmitter.

Another object of this invention is to provide a multiplexer transmiter terminator for connection with a multiplexer transmitter which resets the transmitter upon completion of transmission of all transmitters connected to the communication line.

Another object of this invention is to provide a multiplexer transmitter terminator for connection with a multiplexer transmitter which may be easily programed for use in any time sequence of the plurality of multiplexer transmitters on the communication line.

Another object of this invention is to provide a multiplexer transmitter terminator for connection with a multiplexer transmitter which is easily connected to existing multiplexer transmitters.

Another object of this invention is to provide a multiplexer transmitter terminator for connection with a multiplexer transmitter which is theoretically capable of operating with an unlimited number of multiplexer transmitters.

SUMMARY OF THE INVENTION

The invention may be incorporated into a circuit for a multiplexer unit in a system having a plurality of multiplexer units each being connected on a common communication line wherein each multiplexer unit has an operating period relative to a multiplexer time clock, comprising in combination: a counter circuit having an input connected to the multiplexer time clock for providing a counter output upon registering a preselected clock count which corresponds to the time period of the multiplexer unit; a line receiver connected to the communication line for providing a line receiver output upon detecting a predetermined period of signal absence on the communication line; means connecting said line receiver output to said counter circuit for resetting said counter circuit after said period of signal absence on the communication line; and means connecting said counter circuit output to the multiplexer unit to transfer information through the communication line only at the time period of the multiplexer unit.

Other objects and a fuller understanding of the invention may be had by referring to the following description and claims, taken in conjunction with the accompanying drawing.

DESCRIPTION OF THE PREFERRED EMBODIMENT

Figure 1:
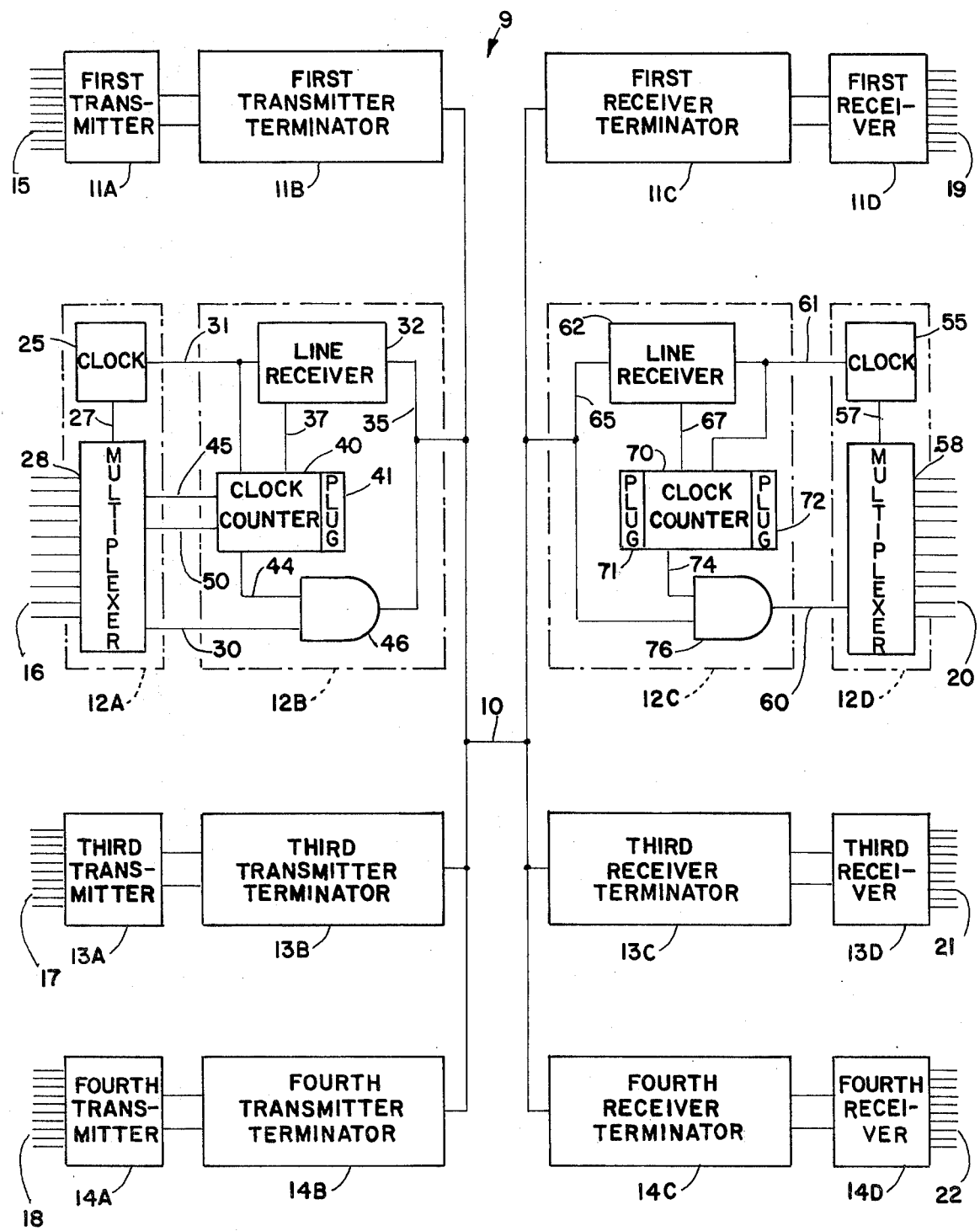
FIG. 1 is a block diagram of a multiplexer system having a plurality of multiplexer transmitters connected to one end of a communication line by a plurality of transmitter terminators with a plurality of multiplexer receivers connected to the other end of the communication line by a plurality of receiver terminators.

FIG. 1 is a block diagram of a multiplexer system 9 having a communication line 10 with first through fourth transmitters 11A-14A connected through first through fourth transmitter terminators 11B-14B to one end of the communication line 10 with fist through fourth receiver terminators 11C-14C interconnecting the other end of communication line 10 with multiplexer receivers 11D-14D; respectively. Each of the transmitters 11A-14A are substantially identical each having a plurality of multiplexer inputs 15-18 respectively, whereas each of the receivers 11D-14D are substantially identical each having a plurality of multiplexer outputs 19-22, respectively. The inputs 15-18 correspond with the outputs 19-22 forming four transmitter-receiver units 11-14. In the prior art, a single transmitter for example 12A was directly connected by the communication line 10 to receiver 12D whereby the information on the inputs 16 was sequentially transferred through the communication line 10 to outputs 20 of the receiver 12D.

The second unit comprising transmitter 12A, transmitter terminator 12B, receiver terminator 12C, and receiver 12D has been expanded in size to show the internal circuits but it is understood that the same circuits exists in the remaining units 11, 13 and 14. The transmitter 12A comprises a multiplexer time clock 25 which is connected by a connector 27 to a multiplexer 28 to transfer the information on the inputs 16 sequentially in time on an output connector 30 of the multiplexer 28. The clock 25 regulates the time of transfer for each one of the plurality of inputs 16. The transmitter terminator 12B includes a line receiver 32 which is connected to the clock 25 by a connector 31 and is also connected by a connector 35 to the communication line 10 to provide an output on connector 37 when the line receiver detects an absence of signal on the communication line 10 for a predetermined period of time. The connector 37 is connected to a reset terminal of a counter 40 which counter is connected by the connector 31 to count the clock pulses of the clock 25 in the transmitter 12A. A program plug 41 is connected to the counter 40 to provide counter outputs on connectors 44 and 45 when the counter 40 counts the predetermined number of clock pulses from clock 25 determined by the program plug 41. The output 44 of the counter 40 enables gate 46 to pass signals from the output connector 30 of multiplexer 28 to the communication line 10. The output 45 of counter 40 activates the transmitter 12A to begin transmission on connector 30. A connector 50 interconnects the multiplexer 28 and the counter 40 to terminate the counter output on connector 44 to disenable gate 46 after the transmitter 12A has transmitted the information on inputs 16.

Figure 2:
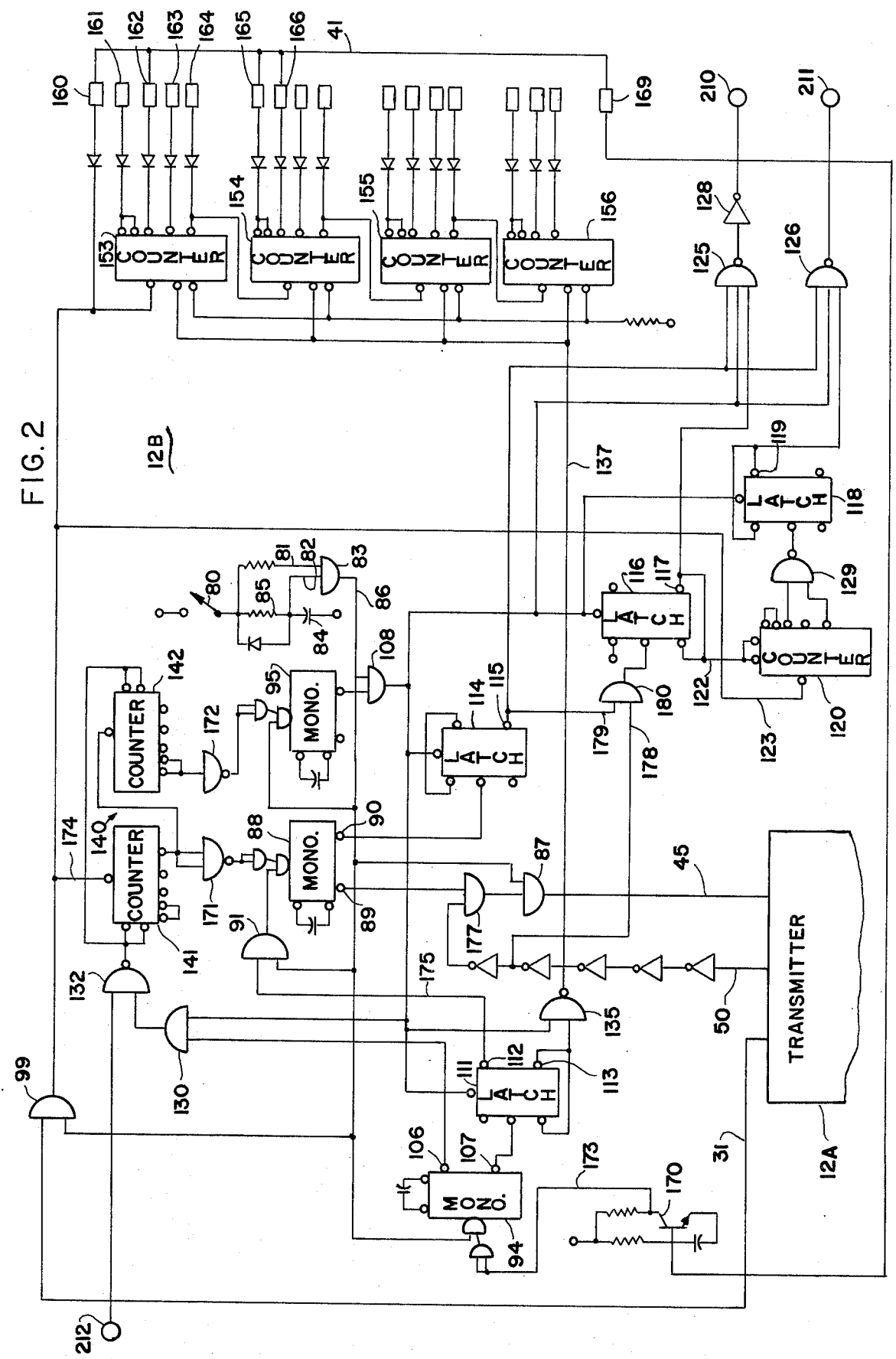
FIG. 2 is a schematic diagram of a portion of the transmitter terminator shown in FIG. 1.

The receiver 12D comprises a multiplexer time clock 55 which is connected by connector 57 to a multiplexer 58 to separate the sequential information received on connector 60 to correspond the inputs 16 with the outputs 20. The receiver 12D is connected to the receiver terminator 12C which receiver terminator includes a line receiver 62 which is connected to the clock 55 by a connector 61 and is also connected by a connector 65 to the communication line 10 to provide a line receiver output on connector 67 when the line receiver detects an absence of signal on the communication line 10 for a predetermined period of time. The connector 67 is connected to a reset terminal of a counter 70 which counter is connected by the connector 61 to count the clock pulses of the clock 55 in the receiver 12D. The clock 55 may be included in the receiver 12D as shown in FIG. 1 or may be a separate clock in the receiver terminator 12C as shown in FIG. 2. A first and second programmable plug 71 and 72 are connected to the counter 70 to provide a counter output on connector 74 when counter 70 counts a first predetermined number of clock pulses from clock 55 determined by the first plug 71. The output on connector 74 is terminated when the counter 70 counts a second predetermined number of clock pulses determined by the second plug 72. A gate 76 transfers information from the communication line 10 to the input 60 of the multiplexer 58 when an output exists on connector 74 from the counter 70.

In the multiplexer system 9, each unit 11-14 is assigned a specific time period in which to transfer information from the inputs 15-18 to the outputs 19-22, respectively. For example, the first transmitter 11A and first receiver 11D may be assigned from 1 to 100 pulses whereas the second transmitter 12A and second receiver 12D may be assigned from 101 to 200 pulses whereas the third transmitter 13A and third receiver 13D may be assigned from 201 to 300 pulses and accordingly the fourth transmitter 14A and receiver 14D from 301 to 400 pulses. The assigned time period is programed into the transmitter terminator 12B by programmable plug 41 and is programed into receiver terminator 12C by programmable plugs 71 and 72. The assigned time periods are dependent upon the clock rate and the number of inputs to each multiplexer transmitter so the aforementioned times are only by way of example. It is also evident that a substantially unlimited number of transmitters and receivers may be incorporated into the system.

Upon applying power to the system 9 there will be an absence of signal on the communication line 10. The line receivers in the transmitter terminators 11B-14B and the receiver terminators 11C-14C including line receivers 32 and 62 will detect a predetermined period of signal absence on the communication line 10 and reset the counters in the transmitter and receiver terminators including counters 40 and 70. All counters commence counting and at the count of 001 pulses the counters in terminators 11B and 11C interconnect transmitter 11A to receiver 11D. The information from inputs 15 is transferred to outputs 19. The counters in terminators 11B and 11C disconnect transmitter 11A from receiver 11D at the count of 100 pulses. At count 101 pulses, counters 40 and 70 provide outputs on connectors 44 and 74 to enable gates 46 and 76. The counter output on connector 45 activates transmitter 12A to begin the sequential transmission of information on the inputs 16 through gate 46, communication line 10 and gate 76 to the outputs 20. The multiplexer 58 arranges the information on the outputs 20 to respectively correspond to the inputs 16 as well known to the art. When transmitter 12A completes transmission, a signal is transferred through connector 50 to the counter 40 to terminate the output on connector 44 to disenable gate 46. The preprogramed second programmable plus 72 connected to counter 70 terminates the counter output on connector 74 at count 200 pulses to disenable gate 76 and thereby disconnects the multiplexer receiver 12D from the communication line 10. The programming of plugs 41 and 71 must correspond to the beginning of the communication period whereas the programming of plug 72 must correspond to the termination of the communication period. Upon the count of 201 pulses terminators 13B and 13C will connect transmitter 13A to receiver 13D. The connection will be terminated at 300 pulses and upon the count of 301 transmitter 14A will be connected to receiver 14D by their respective terminators 14B and 14C. After transmitter 13A has completed transmission and the transmitter and the receiver 14A and 14D have been disconnected, the communication line 10 is silent. Passing of a predetermined period of time results in the line receivers resetting the terminator counters to begin the interconnection of the units 11-14 as heretofore described.

The foregoing description was for example only and in actual practice the connection and disconnection of the transmitters and receivers are more complex as will be hereinafter described. Units have been constructed in which a period of silence of 32 counts will reset all line receivers. All terminators begin counting from time 000 but the receiver terminator counters provide an output 6 counts after the transmitter terminator counters. This is due to an 8 count delay existing in the transmitters as described in the aforementioned U.S. Pat. Nos. 3,691,304; 3,691,305; 3,723,658; 3,737,677 which are owned by the assignee of the instant invention and are hereby incorporated by reference into this disclosure.

FIG. 2 is a schematic diagram of a portion of the transmitter terminator 12B of FIG. 1. Three of the four connections namely 31, 45 and 50 interconnecting the transmitter 12A to the terminator 12B are shown connected to circuit elements of the transmitter terminator 12B. When power is applied to the terminator by switch 80, input 81 of AND gate 83 is in a high bistable condition (HIGH) whereas input 82 is in a low bistable condition (LOW). The LOW output of AND gate 83 an line 86 disenables monostables 94 and 95 and disenables AND gate 87 to disconnect input to the reset line 45 to the transmitter 12A. The LOW on line 86 is applied to AND gate 91 to disenable monostable 88 and is simultaneously applied to AND gate 99 for blocking signals on connector 31 from the clock 25 in the transmitter 12A. Through an AND gate 108, the LOW on line 96 resets latches 111, 114, 116 and 118. The reset of latch 116 disenables a counter 120 and NAND gate 125 as will be hereinafter described. The LOW is also applied to NAND gates 125 and 126. The output of AND gate 108 is applied through NAND gate 135 along connector 137 to reset counter units 153–156 and also resets a pause counter 140 including counter units 141 and 142 through AND gate 130 and NAND gate 132. Capacitor 84 continues to charge through resistor 83 and eventually provides a HIGH to input 82 making the output of AND gate 83 HIGH. A HIGH on line 86 enables counting of the clock pulses from transmitter 12A by the counter units 153–156 and the circuit commences operation. This power on circuit functions only when power is first applied to the system.

The output from the multiplexer clock 25 on connector 31 is applied through AND gate 99 to the counter 30 units 153–156 which are interconnected to provide binary outputs along the binary terminals some of which are shown as 160–166. The terminals will display a 0 or 1 output depending upon the number of pulses received by the counter units. The terminals may represent the number of counts received, for example, 160 may represent $2^0$; 161 may represent $2^1$; 162 may represent $2^3$; 164 may represent $2^4$; 165 may represent $2^5$; and 166 may represent $2^6$. Consequently, if the time 101 pulses is assigned for transmission, the programmable plug 41 must interconnect terminals 166 ($2^6$), 165 ($2^5$), 162 ($2^2$), and 160 ($2^0$). The programmable plug 41 may be in the form of a multiple connector plug having internal jumper wires interconnecting various pins. Only when the counter units receive 101 pulses will inputs 166, 165, 162 and 160 all be HIGH which HIGH is transferred through terminal 169 to transistor 170.

Transistor 170 corrects and inverts the signal from terminal 169 and connects the inverted signal to clock monostable 94 by connector 173. The clock monostable 94 provides a HIGH first output 106 to the AND gate 130 and NAND gate 132 to reset the pause counter 140 which begins counting clock pulses through AND gate 99 and connector 174. The first counter unit 141, provides a first counter output, a HIGH to NAND gate 171, upon the first counter unit 141 counting a first predetermined number of pulses, for example 16 pulses whereas the second counter unit 142 provides a second counter output, a HIGH to NAND gate 172 upon counting a second predetermined number of pulses, for example 32 pulses. A second output 107 of the clock monostable 94 which second output is delayed in time from the first output 106 is applied to a clock latch circuit 111 which provides a HIGH output 112 along connector 175 to cause a HIGH output of AND gate 91 to enable the pause monostable 88. Since the pause monostable 88 is enabled by AND gate 91 after the pause counter 140 is reset, there is no chance that spurious outputs from the counter 140 will active monostable 88. The pause monostable 88 will activate upon the first HIGH output from the pause counter 140 through NAND gate 171 applying a LOW to the pause monostable output 88. The pause monostable 88 provides a first monostable output 89 which is connected by AND gate 177 to reset the transmitter 12A along connector 45. The transmitter 12A provides a signal on connector 50 through the inverters to apply a LOW to input 178 of AND gate 180. The transmitter 12B then counts 8 pulses before commencing transmission. The second output 90 from the pause monostable 88 is applied to the pause latch circuit 114 making output 115 HIGH. The HIGH output 115 is applied to NAND gates 125 and 126 to make the outputs thereof LOW. The HIGH output 115 is also applied to input 179 of AND gate 180 so that the next reset pulse from transmitter 12A along connector 50 to input 178 will toggle latch 116. The NAND gates 125 and 126 are connected to gate 46 shown in FIGS. 1 and 3 which connect the transmitter 12A to the communication line 10.

Figure 3:
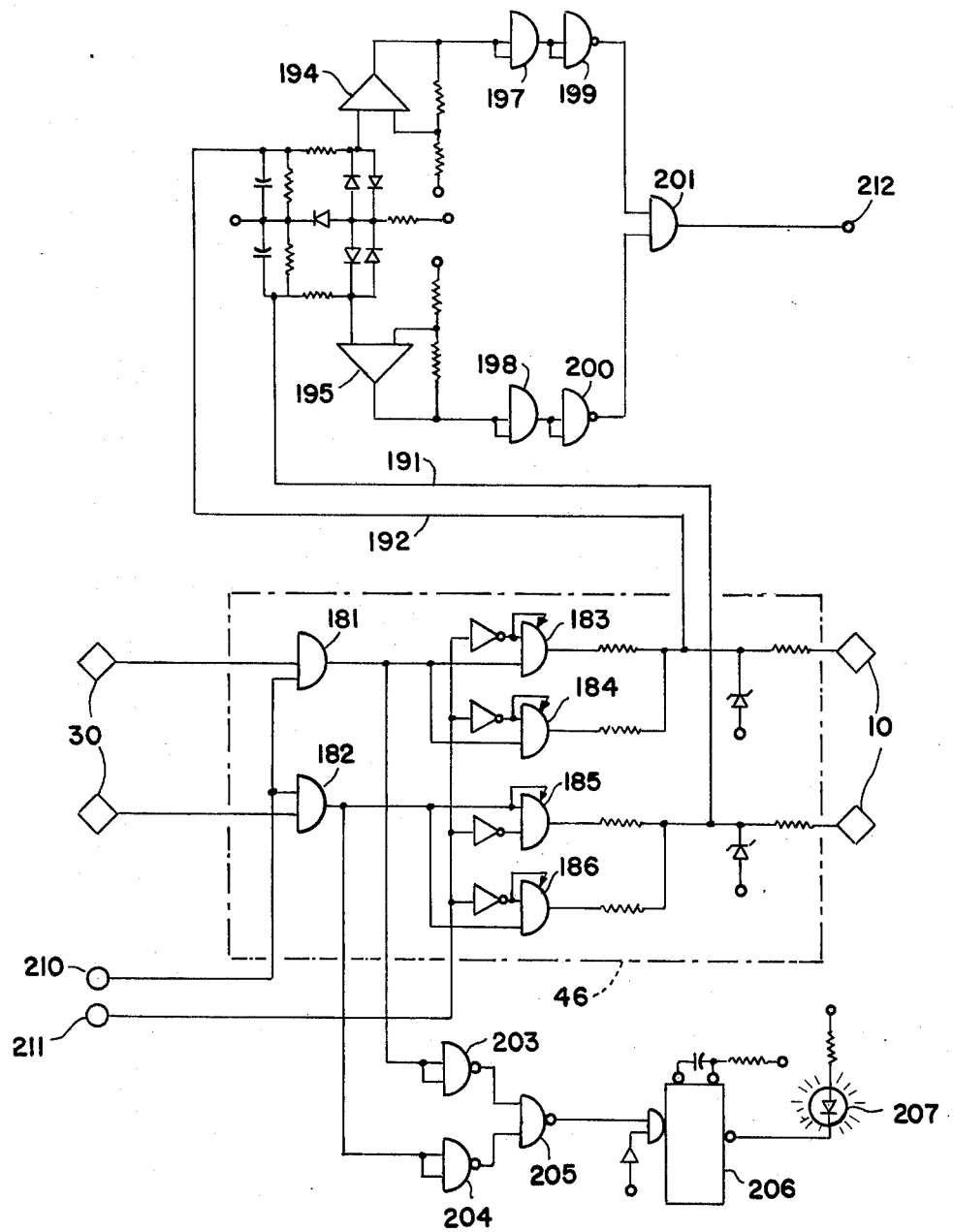
FIG. 3 is a schematic diagram of a portion of the transmitter terminator shown in FIG. 1.

FIG. 3 is a schematic diagram of a portion of the transmitter terminator 12B shown in FIG. 1. NAND gate 125 in FIG. 2 is connected through inverter 128 and terminal 210 to the inputs of AND gates 181 and 182. NAND gate 126 is connected through terminal 211 to gates 183–186. Gates 181–186 interconnect connector 30 to the communication line 10. The gates 183–186 are tri-state gates wherein a LOW on terminal 211 enables gates 183–186 to pass a signal from the connector 30 to communication line 10. These tri-state gates are commercially available as National Semiconductor 8093. The combination of AND gates 181 and 182 and the tri-state 183–186 comprise gate 46 shown in FIG. 1.

After the transmitter 12A has been reset through line 45 and gates 181–186 have been enabled by latch 116, transmitter 12A waits 8 pulses before beginning transmission. The first transmitter 11A in FIG. 1 will disconnect four pulses prior to transmission by the second transmitter 12A or 20 pulses after the first transmitter 11A has completed transmission. This time period prevents unwanted transients on the communication line when gates 181–186 are connecting and disconnecting. The transmitter 12A now completes one transmission. Upon completing the transmission, transmitter 12A provides a signal through connector 50 indicating the transmission has been completed. The signal on conductor 50 applies a HIGH to input 178 of AND gate 180 to toggle latch 116 and make the output 117 LOW. This LOW output 117 is applied to the input of NAND gate 125 which has the remaining two inputs HIGH thereby causing the output of NAND gate 125 to go HIGH. The HIGH output of NAND gate 125 is inverted by inverter 128 to produce a low to AND gates 181 annd 182 in FIG. 3 thereby blocking any signal between the connector 30 and communication line 10. The LOW output 117 of latch 116 also resets counter 120 through connector 122 to enable counter 120 to count clock pulses through AND gate 99 and connector 123. The counter 120 begins to count a preselected number of counts, for example 20 pulses while the pause counter in transmitter terminator 13B is counting to reset transmitter 13A at the count of 16 pulses. When counter 120 counts 20 pulses, counter 120 applies a LOW to NAND gate 129 to activate latch 118 providing a LOW on output 119. The LOW on output 119 is applied to NAND gate 126 to provide a HIGH on terminal 211 causing gates 183–186 to disenable thereby disconnecting the connector 30 from the communication line 10. The third transmitter 13A will begin transmission 4 pulses later.

FIG. 3 illustrates the connectors 191 and 192 connecting the communication line 10 with two amplifiers 194 and 195 for amplifying the signal on the communication line 10 for transmitting the information through AND gates 197 and 198; NAND gates 199 and 200 and AND gate 201. Gates 197–201 form an OR gate to terminal 212 which is connected to the NAND gate 132 in FIG. 2. Connectors 191 and 192; amplifiers 194 and 195 and gates 197–201 form a part of the line receiver 32 shown in FIG. 1. A signal occuring on the transmission line 10 is amplified by either amplifier 194 or 195 and is passed by gates 197–201 through NAND gate 132 in FIG. 2 to reset the pause counter 140. Consequently, the pause counter 140 is constantly being reset during signal transfer on the communication line 10. If signal transfer terminates on the communication line 10, the pause counter 140 is no longer reset and the pause counter 140 is able to count the clock pulses through conductor 174 to generate oututs through gates 171 and 172. FIG. 3 includes a circuit comprising NAND gates 203–205 to a latch 206 for activating a light emitting diode 207 upon the transmitter 12A being connected to the communication line 10.

The signals transmitted by the third transmitter 13A on the communication line 10 are passed through amplifiers 194 and 195 and gate 197–201 and 132 to continually reset counter 140 during the transmission. After all transmitters 11A–14A have transmitted a silence will exist on a communication line 10 and the line receiver circuit 32 will not reset counter 140.

Upon counter 140 counting 32 clock pulses, the output of counter unit 142 goes HIGH providing a LOW output from NAND gate 172 to trigger monostable 95. The LOW output of monostable 95 is applied to the input of AND gate 108 to reset latches 111, 114, 116 and 118 and reset counter units 153–156 and 140 as described for the power-on circuit. The LOW from output 117 of latch 116 is applied to hold the output of NAND gates 125 and 126 HIGH masking any transitions that might occurr as the latches are reset simultaneously, all terminators will be reset. Upon completion of the output from monostable 95, the counter units 153–156 begins counting the clock pulses from transmitter 12B to await the 101 count to reactivate the transmitter 12B.

The receiver terminators 11C–14C operate in a manner similar to the transmitter terminators 11B–14B except that the receiver terminator must provide a signal for both enabling and disenabling the receiver. The transmitter terminator is disenabled by an output on connector 50 from the transmitter. The diagram and description of the receiver terminator may be found in my copending application which was filed concurrently with the instant application and is hereby incorporated by reference into this disclosure.

The invention has been described as a device for a multiplexer unit in a system 9 having a plurality of multiplexer units connected on a common communication line 10 wherein each multiplexer unit has a time period for operation relative to a time clock 25. The invention includes a counter circuit 40 connected to the multiplexer time clock 25 for providing a counter output on line 44 upon registering a preselected clock count which corresponds to the time period of the multiplexer unit. A line receiver 32 is connected by 35 for providing a line receiver output upon detecting a predetermined period of signal absence on the communication line 10. The line receiver 32 is connected by connector 37 for resetting the counter circuit 40 after the period of signal absence on line 10. The counter circuit is connected to the multiplexer unit 28 through gate 46 for enabling the multiplexer unit to transfer information through the communication line 10 only at the time period assigned to the multiplexer unit.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

I claim:

1. A device for a multiplexer unit in a system having a plurality of multiplexer units each being connected on a common communication line wherein each multiplexer unit has an operating period relative to a multiplexer time clock, comprising in combination:
   a counter circuit having an input connected to the multiplexer time clock for providing a counter output upon registering a preselected clock count which corresponds to the time period of the multiplexer unit;
   a line receiver connected to the communication line for providing a line receiver output upon detecting a predetermined period of signal absence on the communication line;
   means connecting said line receiver output to said counter circuit for resetting said counter circuit after said period of signal absence on the communication line;
   and means connecting said counter circuit output of the multiplexer unit to transfer information through the communication line only at the time period of the multiplexer unit.

2. A device as set forth in claim 1, wherein said means connecting said counter circuit to the multiplexer unit includes means for enabling the multiplexer unit a predetermined time after said counter output.

3. A device as set forth in claim 1, wherein said line receiver includes a pause counter having a reset input;
   means connecting said pause counter to the multiplexer time clock for providing said line receiver output upon counting a given number of clock counts;
   and means connecting said reset input to the communication line for resetting said pause counter when a signal occurs on the communication line.

4. A device as set forth in claim 1, including means for deactivating the device for a given duration immediately after operating power is applied.

5. A device as set forth in claim 1, wherein said means connecting said counter circuit to the multiplexer unit includes a counter monostable providing a first and second output sequentially in time upon a counter output;
   a pause counter connected to the multiplexer time clock for providing a pause counter output upon counting a given number of clock counts;
   a gate connected between said pause counter and the multiplexer unit;

means connecting said first output of said counter monostable to initiate counting by said pause counter;

and means connecting said output of said counter monostable for enabling said gate to transfer said pause counter output to the multiplexer unit.

6. A device as set forth in claim 1 including means for varying said preselected clock count to correspond to a specific time period assigned to the multiplexer unit.

7. A device as set forth in claim 6, wherein said means for varying said preselected clock count includes said clock counter having a plurality of outputs with a combination thereof providing numerical output of the count of the counter;

and means for connecting selected ones of said plurality of clock counter outpput to provide said counter output when a common output exists on said selected outputs.

8. A device as set forth in claim 1, including means for visually indicating the transfer of information on the communication line by the multiplexer unit.

9. A device for a multiplexer transmitter which transmits plural information in a system having a plurality of multiplexer transmitters on a common communication line wherein each multiplexer transmitter is assigned a transmission time period relative to a multiplexer time clock, comprising in combination:

a counter circuit having an input connected to the multiplexer time clock for providing a counter output upon registering a preselected clock count;

means for varying said preselected clock count of said counter circuit to correspond to the time period assigned to the multiplexer transmitter;

a line receiver connected to the communication line for providing a line receiver output upon detecting a predetermined period of signal absence on said communication line;

means connecting said line receiver output to said counter circuit for resetting said counter circuit after said predetermined period of signal absence;

means connecting said counter circuit output to the multiplexer transmitter for enabling transmission of the plural information through the communication line upon an output from said counter circuit;

and means for disenabling the transmitter from the communication line upon completion of the transmission of the multiplexer transmitter.

10. A device as set forth in claim 9, wherein said means connecting said counter circuit to the multiplexer transmitter includes a line gate for connecting the multiplexer transmitter to the communication line;

and means connecting said counter output for enabling said line gate to connect the multiplexer transmitter to the communication line.

11. A device as set forth in claim 9, wherein said means connecting said counter circuit to the multiplexer transmitter includes a line gate interconnecting the multiplexer transmitter and the communication line;

a pause monostable providing a first and a second output sequentially in time upon a counter output;

means connecting said first output of said pause monostable for activating the multiplexer transmitter;

and means connecting said second output of said pause monostable for enabling said line gate to connect the multiplexer transmitter to the communication line.

12. A device as set forth in claim 9, wherein said means for disenabling the multiplexer transmitter includes means for disconnecting said multiplexer transmitter from the communication line a predetermined time after completion of the transmission of the multiplexer transmitter.

13. A device as set forth in claim 9, including means for terminating operation of said counter circuit upon a counter output until said counter circuit is reset by said line receiver.

14. A device as set forth in claim 9, wherein said line receiver connected to the communication line includes a gate interconnecting said line receiver to the communication line.

15. A device for connection to one of a plurality of multiplexer transmitters on a communication line wherein each multiplexer transmitter is assigned a unique transmission period relative to a multiplexer clock generating clock pulses, comprising in combination:

a line gate for connecting the multiplexer transmitter to the communication line;

a programmable clock counter connected to the multiplexer clock for providing a clock counter output upon counting a preprogramed number of multiplexer clock pulses which correspond to the beginning of the unique transmission period;

means connecting said clock counter for enabling said line gate and for activating the multiplexer transmitter to connect the multiplexer transmitter to the communication line upon said counter counting said preprogramed number of clock pulses;

means connected between the multiplexer transmitter and said line gate for disenabling said line gate after termination of transmission of the multiplexer transmitter to disconnect the multiplexer transmitter from the communication line;

and means initiating said clock counter to count said reprogramed number of clock pulses upon a silence existing on the communication line for a predetermined period.

16. A device for a multiplexer transmitter which transmits plural information on a communication line having a plurality of multiplexer transmitters connected thereto wherein each multiplexer transmitter is assigned a specific time period for transmission relative to a multiplexer time clock generating clock pulses, comprising in combination:

a line gate for connecting the multiplexer transmitter to the communication line;

a programmable clock counter connected to the multiplexer time clock for providing a clock counter output upon counting a preprogramed number of clock pulses which corresponds to the assigned period for transmission;

a pause counter connected to the multiplexer time clock for providing a first and a second pause output upon counting a first and a second preselected number of multiplexer time clock pulses, respectively;

means connecting said clock counter to said pause counter to commence counting of said first preselected number of multiplexer time clock pulses by sid pause counter upon said clock counter output;

means connecting said pause counter to the multiplexer transmitter and said line gate for enabling the multiplexer transmitter and said line gate to connect the multiplexer transmitter to the communication line upon said first pause output;

a disenable counter connected to the multiplexer time clock for providing a disenable output uon counting a predetermined number of multiplexer time clock pulses;

means connecting said disenable counter between the multiplexer transmitter and said line gate for initiating counting of said disenable counter upon termination of transmission of the multiplexer transmitter to disenable said line gate upon said disenable output to disconnect the multiplexer transmitter from the communication line;

means connecting said pause counter to the communication line for providing said second pause output upon a silence existing on the communication line exceeding said second preselected number of multiplexer clock pulses;

and means connecting said pause counter to said clock counter for initiating counting of said clock counter upon said second pause output.

17. A device for a multiplexer transmitter which transmits information from a plurality of multiplexer inputs in a system having a plurality of multiplexer transmitters connected on a common communication line wherein each multiplexer transmitter is assigned a specific time period for transmission relative to a multiplexer time generating clock pulses, comprising in combination:

line gate means for connecting the multiplexer transmitter to the communication line;

a programmable clock counter connected to the multiplexer time clock for providing a clock counter output upon counting a preprogramed number of clock pulses which corresponds to the specific time period assigned to the multiplexer transmitter;

a clock monostable connected to said clock counter for providing a first and a second output sequentially in time upon said clock counter output;

a pause counter connected to the multiplexer time clock for providing a first and a second pause counter output upon counting a first and a second number of preselected clock pulses, respectively;

means connecting said first output of said clock monostable for resetting said pause counters;

a clock latch circuit connected to said clock monostable for providing a latch output upon said second output of said clock monostable;

means connecting said latch output of said clock latch circuit for resetting said clock counter;

a cause monostable having enabling means and an input for providing a first and a second pause monostable output sequentially in time upon input thereto;

means connecting said latch output of said clock latch circuit for enabling said pause monostable;

means connecting said first pause counter output of said pause counter for providing an input to said pause monostable to produce said first and second pause monostable outputs upon said pause counter counting said first member of preselected clock pulses;

means connecting said first pause monostable output of said pause monostable for the multiplexer transmitter;

a pause latch circuit connected to said pause monostable for providing a latch output upon said second pause monostable output;

means connecting said latch output of said pause latch circuit to enable said line gate means for connecting the multiplexer transmitter to the communication line;

a disenable latch circuit having enabling means for providing an output upon an input to said disenable latch circuit;

a disenable counter connected to the multiplexer time clock for providing an output upon counting a given number of multiplexer clock pulses;

means connecting said pause latch circuit to said enabling means of said disenable latch circuit to enable said disenable latch circuit upon said latch output of said pause latch circuit;

means connecting the multiplexer transmitter to said disenable latch circuit for providing an input thereto upon termination of transmission of the multiplexer transmitter;

means connecting said output of said disenable latch circuit to said disenable counter to initiate counting by said disenable counter;

means connecting said disenable counter to said line gate means to disenable said line gate and disconnect the multiplexer transmitter from the communication line upon said disenable counter counting said given number of multiplexer clock pulses after termination of transmission by the multiplexer transmitter;

means connecting the communication line to said pause counter for resetting said pause counter upon a signal occuring on the communication line;

and means connecting said second pause counter output for resetting the device and initiating counting of said programmable clock counter upon the absence of a signal on the communication line existing for a duration equal to said second number of preselected clock pulses.

* * * * *